(12) United States Patent
Groninga et al.

(10) Patent No.: US 11,873,085 B2
(45) Date of Patent: *Jan. 16, 2024

(54) VTOL AIRCRAFT WITH TILTING ROTORS AND TILTING DUCTED FANS

(71) Applicant: Bell Textron Inc., Fort Worth, TX (US)

(72) Inventors: Kirk L. Groninga, Keller, TX (US); Daniel B. Robertson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 229 days.

This patent is subject to a terminal disclaimer.

(21) Appl. No.: 17/366,834

(22) Filed: Jul. 2, 2021

(65) Prior Publication Data

US 2021/0331793 A1    Oct. 28, 2021

Related U.S. Application Data

(63) Continuation of application No. 16/442,288, filed on Jun. 14, 2019, now Pat. No. 11,091,258.

(51) Int. Cl.
*B64C 29/00* (2006.01)
*B64C 39/04* (2006.01)
*B64D 27/02* (2006.01)

(52) U.S. Cl.
CPC ...... *B64C 29/0033* (2013.01); *B64C 29/0025* (2013.01); *B64C 39/04* (2013.01); *B64D 2027/026* (2013.01)

(58) Field of Classification Search
CPC .................. B64C 29/0033; B64C 39/04
USPC ........................................... 244/7 A
See application file for complete search history.

(56) References Cited

U.S. PATENT DOCUMENTS

| | | |
|---|---|---|
| 1,990,308 A | 2/1935 | Phillips |
| 3,181,810 A | 5/1965 | Olson |
| 5,035,377 A | 7/1991 | Buchelt |
| 10,252,797 B2 | 4/2019 | Vondrell et al. |
| 10,501,173 B1 | 12/2019 | Douglas et al. |
| 10,988,248 B2 | 4/2021 | Mikić et al. |
| 11,091,258 B2 * | 8/2021 | Groninga ............ B64C 29/0025 |
| 2003/0094537 A1 | 5/2003 | Austen-Brown |
| 2011/0168835 A1 | 7/2011 | Oliver |
| 2011/0180671 A1 | 7/2011 | Campbell et al. |

(Continued)

FOREIGN PATENT DOCUMENTS

| | | |
|---|---|---|
| EP | 3647193 A1 | 5/2020 |
| FR | 1534814 A | 8/1968 |

(Continued)

OTHER PUBLICATIONS

Groninga, Kirk L., et al.; "Duct With Optimized Horizontal Stator Shape"; U.S. Appl. No. 16/442,180, filed Jun. 14, 2019; 35 pages.

*Primary Examiner* — Christopher P Ellis
(74) *Attorney, Agent, or Firm* — Bradley Arant Boult Cummings LLP

(57) ABSTRACT

An exemplary tiltrotor aircraft having a vertical takeoff and landing (VTOL) flight mode and a forward flight mode includes tiltable rotors located at forward boom ends, tiltable ducted fans located at wings aft of the forward boom ends, and aft rotors located on aft boom portions.

11 Claims, 5 Drawing Sheets

(56) References Cited

U.S. PATENT DOCUMENTS

| | | | |
|---|---|---|---|
| 2012/0091257 A1* | 4/2012 | Wolff | B64C 39/024 244/12.4 |
| 2013/0206921 A1 | 8/2013 | Paduano et al. | |
| 2015/0102175 A1 | 4/2015 | Guetta | |
| 2015/0197335 A1 | 7/2015 | Dekel et al. | |
| 2015/0274292 A1 | 10/2015 | DeLorean | |
| 2015/0314865 A1 | 11/2015 | Bermond et al. | |
| 2016/0229531 A1* | 8/2016 | Robertson | B64C 11/28 |
| 2017/0369161 A1 | 12/2017 | Alzahrani | |
| 2018/0105279 A1 | 4/2018 | Tighe et al. | |
| 2018/0281936 A1 | 10/2018 | Robertson et al. | |
| 2018/0362154 A1* | 12/2018 | Louis | B64C 27/30 |
| 2019/0031333 A1 | 1/2019 | Groninga et al. | |
| 2019/0100303 A1 | 4/2019 | Campbell | |
| 2019/0100313 A1 | 4/2019 | Campbell | |
| 2019/0100322 A1 | 4/2019 | Schank | |
| 2019/0135425 A1 | 5/2019 | Moore et al. | |
| 2019/0315471 A1 | 10/2019 | Moore et al. | |
| 2019/0329882 A1 | 10/2019 | Baity et al. | |
| 2019/0339334 A1 | 11/2019 | Mikolajczak | |
| 2020/0148347 A1 | 5/2020 | Bevirt et al. | |
| 2020/0269975 A1 | 8/2020 | Fink et al. | |
| 2020/0285251 A1 | 9/2020 | Anishchenko et al. | |
| 2020/0355085 A1 | 11/2020 | Lemarchand et al. | |
| 2020/0361622 A1* | 11/2020 | Groninga | B64C 27/28 |
| 2020/0391861 A1 | 12/2020 | Groninga et al. | |
| 2020/0398983 A1 | 12/2020 | Singh et al. | |
| 2021/0107640 A1 | 4/2021 | Baity et al. | |
| 2021/0114723 A1 | 4/2021 | Wittmaak, Jr. et al. | |
| 2021/0229825 A1* | 7/2021 | Eppink | B64D 35/04 |
| 2021/0300527 A1* | 9/2021 | Thalheimer | B64C 29/0025 |
| 2022/0009626 A1* | 1/2022 | Baharav | B64C 27/26 |
| 2022/0306292 A1* | 9/2022 | Ross | B64C 39/08 |
| 2022/0324558 A1* | 10/2022 | Ross | B64C 29/0033 |
| 2022/0388647 A1* | 12/2022 | Ivans | B64C 39/024 |
| 2022/0402603 A1* | 12/2022 | Frank | B64D 27/26 |
| 2023/0056974 A1* | 2/2023 | Foskey | B64D 27/24 |
| 2023/0150659 A1* | 5/2023 | Ivans | B64U 50/19 244/12.4 |
| 2023/0192285 A1* | 6/2023 | Asanuma | B64C 29/0008 244/6 |

FOREIGN PATENT DOCUMENTS

| | | |
|---|---|---|
| GB | 757279 A | 9/1956 |
| GB | 981591 A | 1/1965 |
| WO | WO-2017184742 A1 | 10/2017 |
| WO | WO-2023015146 A2 * | 2/2023 |

* cited by examiner

VTOL AIRCRAFT WITH TILTING ROTORS AND TILTING DUCTED FANS

CROSS-REFERENCE TO RELATED APPLICATIONS

This application is a continuation of U.S. application Ser. No. 16/442,288, filed Jun. 14, 2019, the contents of which are incorporated by reference in their entirety herein for all purposes.

TECHNICAL FIELD

The present disclosure relates, in general, to aircraft having a forward flight mode and a vertical takeoff and landing flight mode and, in particular, to an aircraft having tiltable un-ducted rotors and tiltable ducted fans that are operable to transition between a forward thrust orientation and a vertical lift or hover orientation.

BACKGROUND

This section provides background information to facilitate a better understanding of the various aspects of the disclosure. It should be understood that the statements in this section of this document are to be read in this light, and not as admissions of prior art.

Fixed-wing aircraft, such as airplanes, are capable of flight using wings that generate lift responsive to the forward airspeed of the aircraft, which is generated by forward thrust from one or more jet engines or propellers. The wings have an airfoil cross section that deflects air downwardly as the aircraft moves forward, generating vertical lift to support the airplane in flight. Fixed-wing aircraft, however, require a runway for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter, which is a rotorcraft having one or more rotors that provide vertical lift and forward thrust to the aircraft. Helicopter rotors not only enable hovering, vertical takeoff and vertical landing, but also enable, forward, aftward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft utilize tiltable rotor systems that are operable to transition between a forward thrust orientation and a vertical lift orientation. The rotor systems are tiltable relative to a fixed wing such that the associated proprotors have a generally horizontal plane of rotation for vertical takeoff, hovering and vertical landing and a generally vertical plane of rotation for forward flight, wherein the fixed wing provides lift. In this manner, tiltrotor aircraft combine the vertical lift capability of a helicopter with the speed and range of fixed-wing aircraft.

SUMMARY

An exemplary tiltrotor aircraft having a vertical takeoff and landing (VTOL) flight mode and a forward flight mode includes tiltable rotors located at forward boom ends, tiltable ducted fans located at wings aft of the forward boom ends, and aft rotors located on aft boom portions.

An exemplary tiltrotor aircraft having a vertical takeoff and landing (VTOL) flight mode and a forward flight mode includes a first wing extending laterally in a first direction from a fuselage and having a first wing tip distal from the fuselage, a first tiltable ducted fan coupled to the first wing, a second wing extending laterally in a second direction from the fuselage and having a second wing tip distal from the fuselage, a second tiltable ducted fan coupled to the second wing, a first boom coupled to the first wing, the first boom having a first forward boom end located forward of the first wing and a first boom aft end located aft of the first wing, a first tiltable rotor coupled to the first forward boom end, a first aft rotor coupled to a top side of an aft portion of the first boom between the first wing and the first boom aft end, a second boom coupled to the second wing, the second boom having a second forward boom end located forward of the second wing and a second boom aft end located aft of the second wing, a second tiltable rotor coupled to the second forward boom end and a second aft rotor coupled to a top side of an aft portion of the second boom between the second wing and the second boom aft end.

An exemplary method of operating an aircraft including a first wing extending laterally in a first direction from a fuselage and having a first wing tip distal from the fuselage, a first tiltable ducted fan coupled to the first wing at the first wing tip, a second wing extending laterally in a second direction from the fuselage and having a second wing tip distal from the fuselage, a second tiltable ducted fan coupled to the second wing at the second wing tip, a first boom coupled to the first wing inboard of the first wing tip, the first boom having a first forward boom end located forward of the first wing and a first boom aft end located aft of the first wing, a first tiltable rotor coupled to the first forward boom end, a first aft rotor coupled to a top side of an aft portion of the first boom between the first wing and the first boom aft end, a second boom coupled to the second wing inboard of the second wing tip, the second boom having a second forward boom end located forward of the second wing and a second boom aft end located aft of the second wing, a second tiltable rotor coupled to the second forward boom end and a second aft rotor coupled to a top side of an aft portion of the second boom between the second wing and the second boom aft end; and operating the aircraft in the VTOL flight mode wherein the first and second tiltable rotors, the first and second tiltable ducted fans and the first and second aft rotors are rotating and the first and the second tiltable rotors and the first and second tiltable ducts are positioned in a generally horizontal plane.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
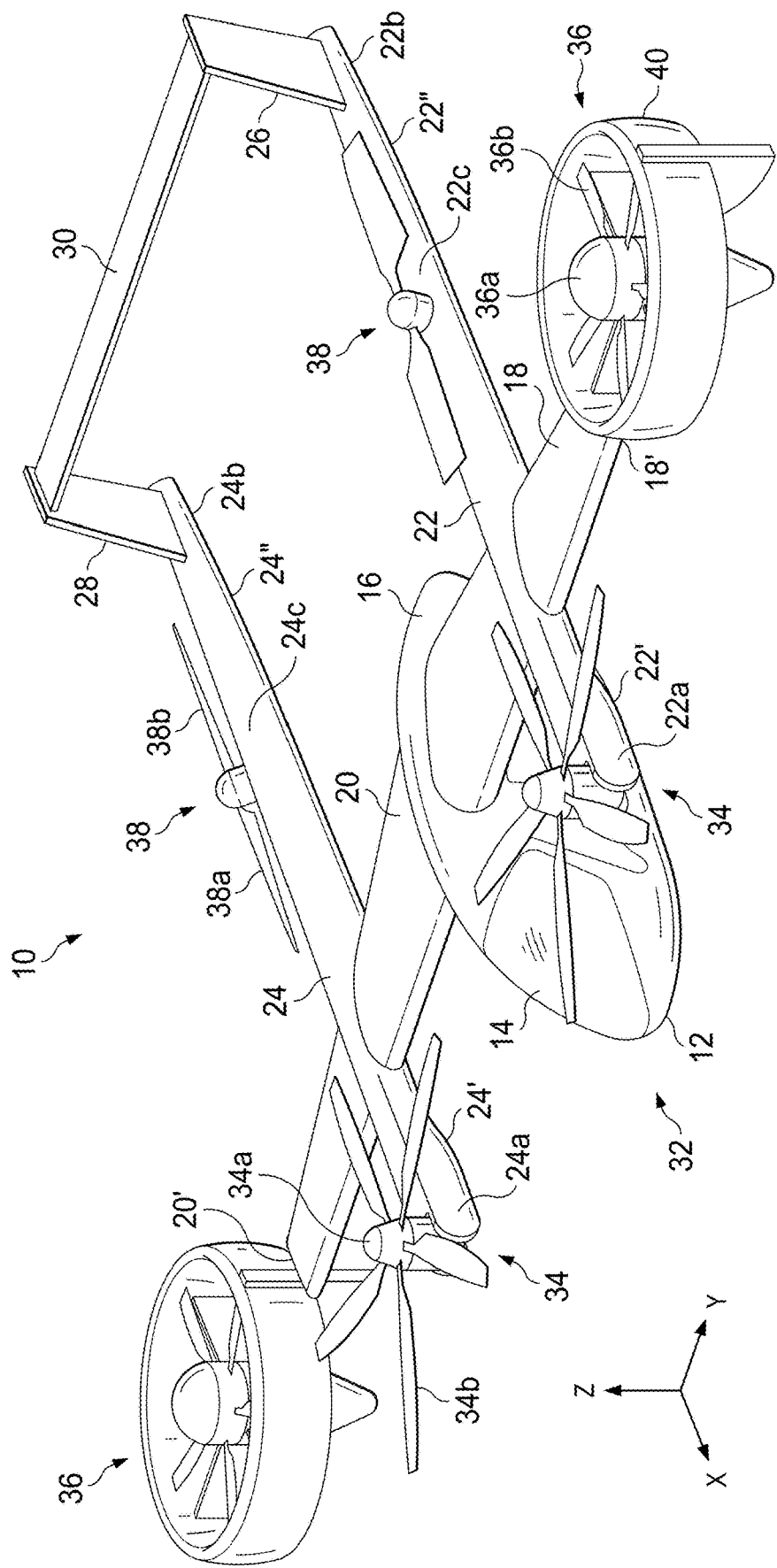
FIGS. 1 and 2 are schematic illustrations of an exemplary VTOL aircraft with tilting rotors and tilting ducted fans aircraft in a hover mode according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Figure 3:
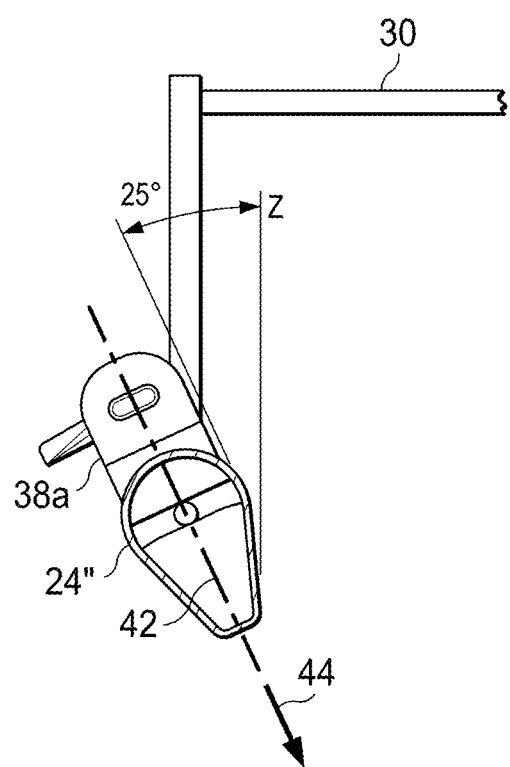
FIG. 3 is a schematic illustration of a profile of an aft boom portion at an aft rotor along the line 3-3 of FIG. 2.

FIGS. 1 and 3 depict three mutually orthogonal directions X, Y, and Z forming a three-dimensional frame of reference XYZ. Longitudinal axis X corresponds to the roll axis that extends through the center of aircraft 10 in the fore and after directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

Figure 2:
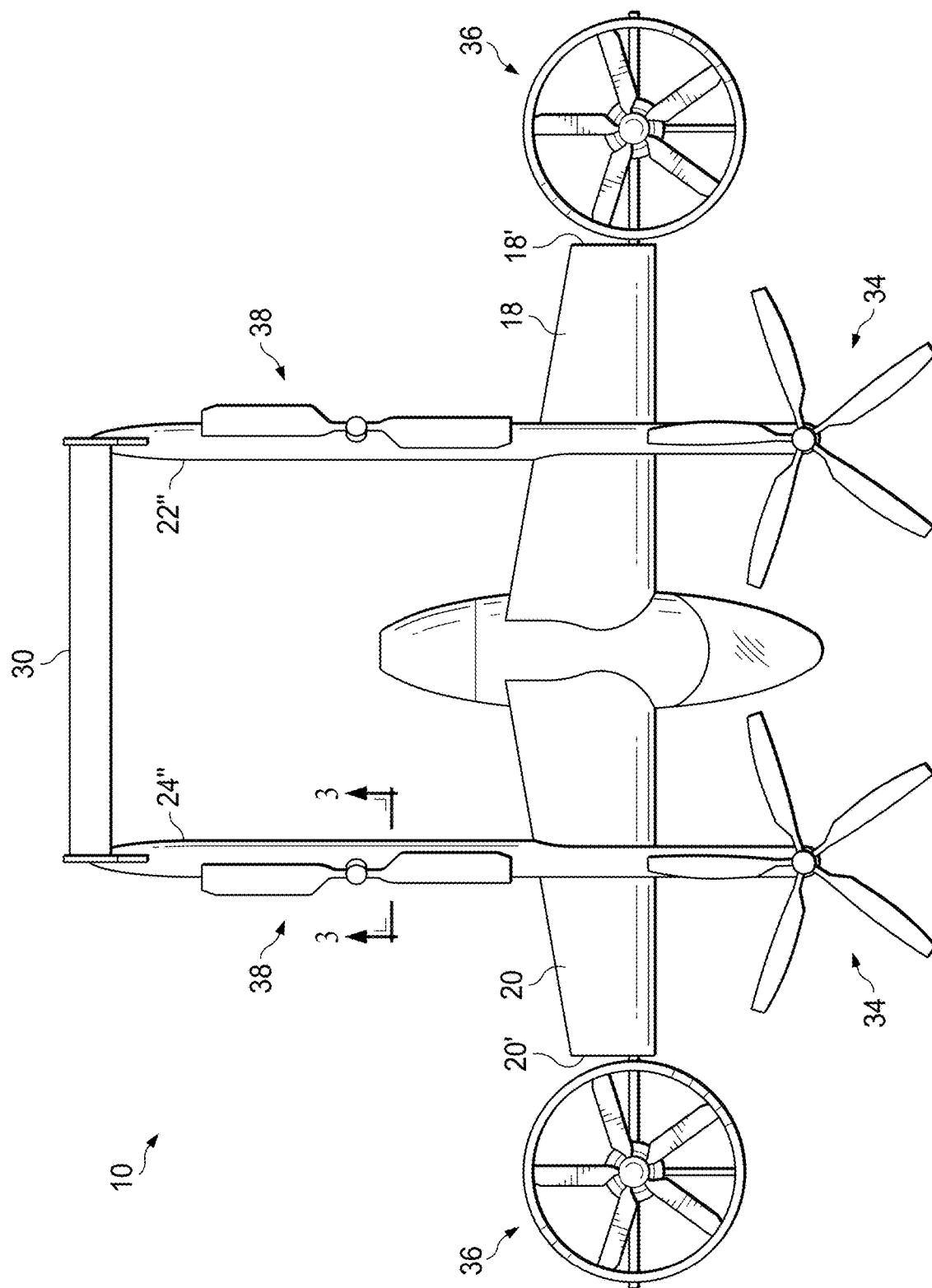
Figure 4:
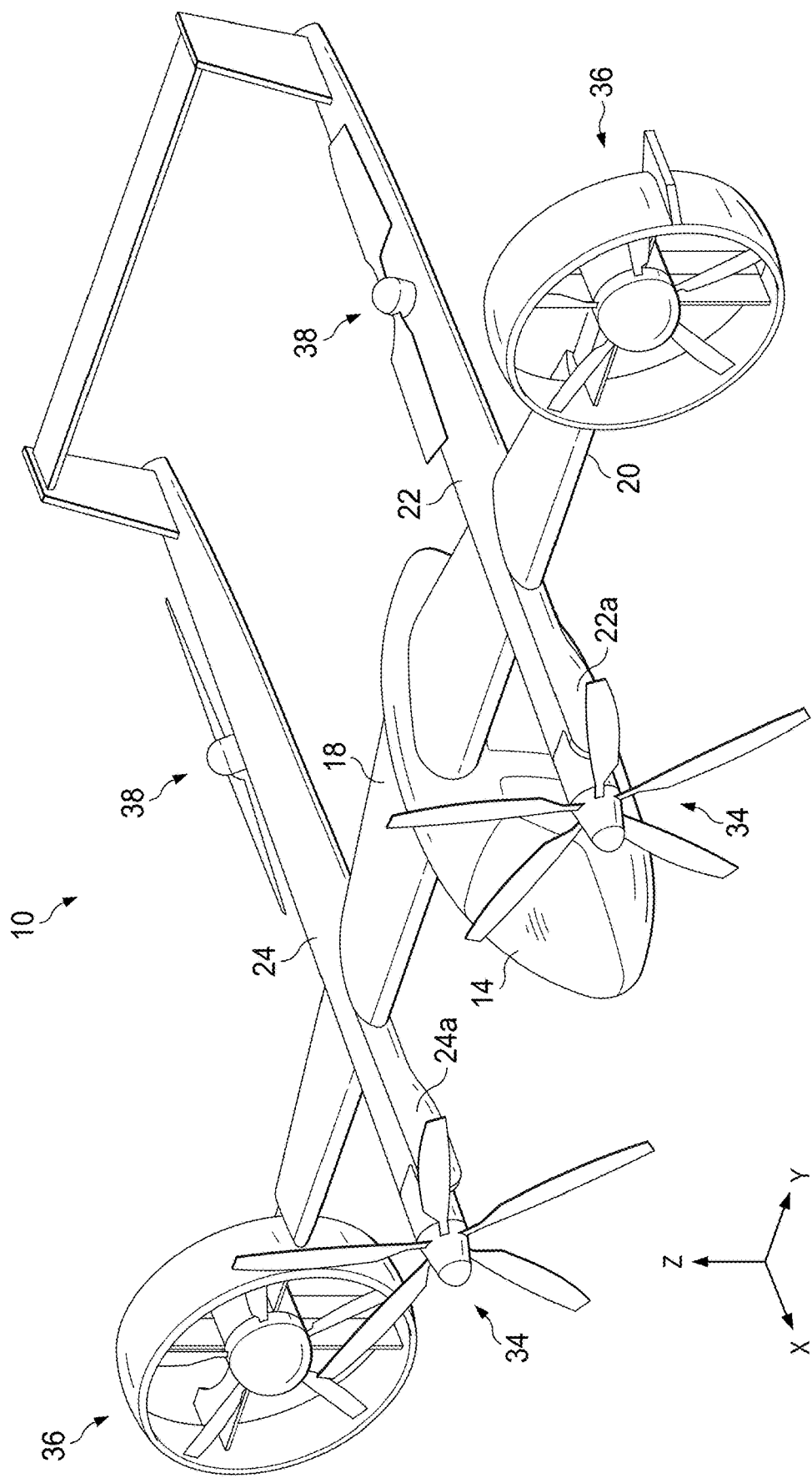
FIG. 4 is a schematic illustration of an exemplary VTOL aircraft with tilting rotors and tilting ducted fans aircraft in a forward flight mode according to one or more aspects of the disclosure.

FIGS. 1, 2 and 4 illustrate an exemplary vertical takeoff and landing (VTOL) aircraft 10 in different flight modes. FIGS. 1 and 2 illustrate aircraft 10 in a VTOL or hover mode and FIG. 4 illustrates aircraft 10 in a forward flight or airplane mode. Aircraft 10 includes fuselage 12 as a central main body. Fuselage 12 extends parallel to longitudinal axis X from a fuselage front end 14 to a fuselage rear end 16. Aircraft 10 does not have a propeller extending from rear end 16 of fuselage 12. Aircraft 10 has a wing 18 and a wing 20 extending laterally in opposite directions from fuselage 12 substantially parallel to transverse axis Y. Wing 18 has a wing tip 18' distal from fuselage 12. Similarly, wing 20 has a wing tip 20' distal from fuselage 12. Wing 18 is coupled to boom 22 located inboard of wing tip 18'. Wing 20 is coupled to boom 24 located inboard of wing tip 20'. Boom 22 and boom 24 are each substantially parallel to longitudinal axis X and, therefore, substantially parallel to fuselage 12. Boom 22 has a forward end 22a, an aft end 22b, and a top side 22c. Boom 24 has a forward end 24a, an aft end 22b, and a top side 24c. Forward ends 22a, 24a are positioned forward of wings 18, 20 along the longitudinal axis X and aft ends 22b, 24b are positioned aft of wings 18, 20 along the longitudinal axis X. A forward portion 22' of boom 22 between forward end 22a and wing 18 and an aft portion 22" of boom 22 between wing 18 and aft end 22b may have different cross-sectional profiles. Similarly, a forward portion 24' of boom 24 between forward end 24a and wing 20 and an aft portion 24" of boom 24 between wing 20 and aft end 24b may have different cross-sectional profiles. FIG. 3 illustrates an illustrative cross-section profile of a boom proximate an aft rotor along the line 3-3 of FIG. 2.

Boom 22 has a vertical stabilizer 26 proximate aft end 22b and boom 24 has a vertical stabilizer 28 proximate aft end 24b. Boom 22 and boom 24 are coupled at vertical stabilizers 26, 28 to a tail member 30 illustrated as a horizontal stabilizer. In the illustrative example, tail member 30 connects to boom 22 and boom 24 adding stiffness to the aircraft, however, as will be understood by those skilled in the technology with the benefit of this disclosure, other tail arrangements may be used. Together, fuselage 12, wings 18, 20, and booms 22, 24 as well as various frames, supports, longerons, stringers, bulkheads, spars, ribs, skins and the like may be considered to be the airframe 32 of aircraft 10.

Aircraft 10 includes a distributed propulsion system coupled to airframe 32. As illustrated, the distributed propulsion system includes tiltable rotors 34, tiltable ducted fans 36, and fixed, non-tiltable, aft rotors 38. Tiltable rotors 34 are located at the respective forward boom ends 22a, 24a forward of wings 18, 20. Tiltable ducted fans 36 are located at the respective wing tips 18', 20' aft of tiltable rotors 34. Tiltable rotors 34 and tiltable ducted fans 36 are reversibly tiltable between the VTOL mode shown in FIGS. 1 and 2 and the airplane mode shown in FIG. 3. Fixed, non-tiltable, aft rotors 22 are located on the respective boom top sides 22c, 24c and rotate in a plane generally parallel to the plane XY or canted relative to the plane XY as further described below. The distributed propulsion system may provide an equal distribution of thrust in the hover mode.

Tiltable rotors 34 include a hub 34a from which blades 34b extend. Tiltable rotors 34 are not enclosed in a duct. Tiltable ducted fans 36 include a duct 40 that surrounds, or partially encloses, a rotor including a hub 36a from which blades 36b extend. Blades 34b, 36b can be collectively manipulated to selectively control direction, thrust and lift of aircraft 10. Indeed, the collective pitch of blades 34b, 36b may be independently controlled to allow for different thrusts by each rotor assembly. Fixed aft rotors 38 include a hub 38a from which blades 38b extend. In the illustrated exemplary embodiments, aft rotors 38 have only two blades 38b that can be aligned parallel with booms 22, 24 when not rotating during forward flight. In some embodiments, blades 38b may be retracted inside of booms 22, 24 when not rotating.

Figure 5:
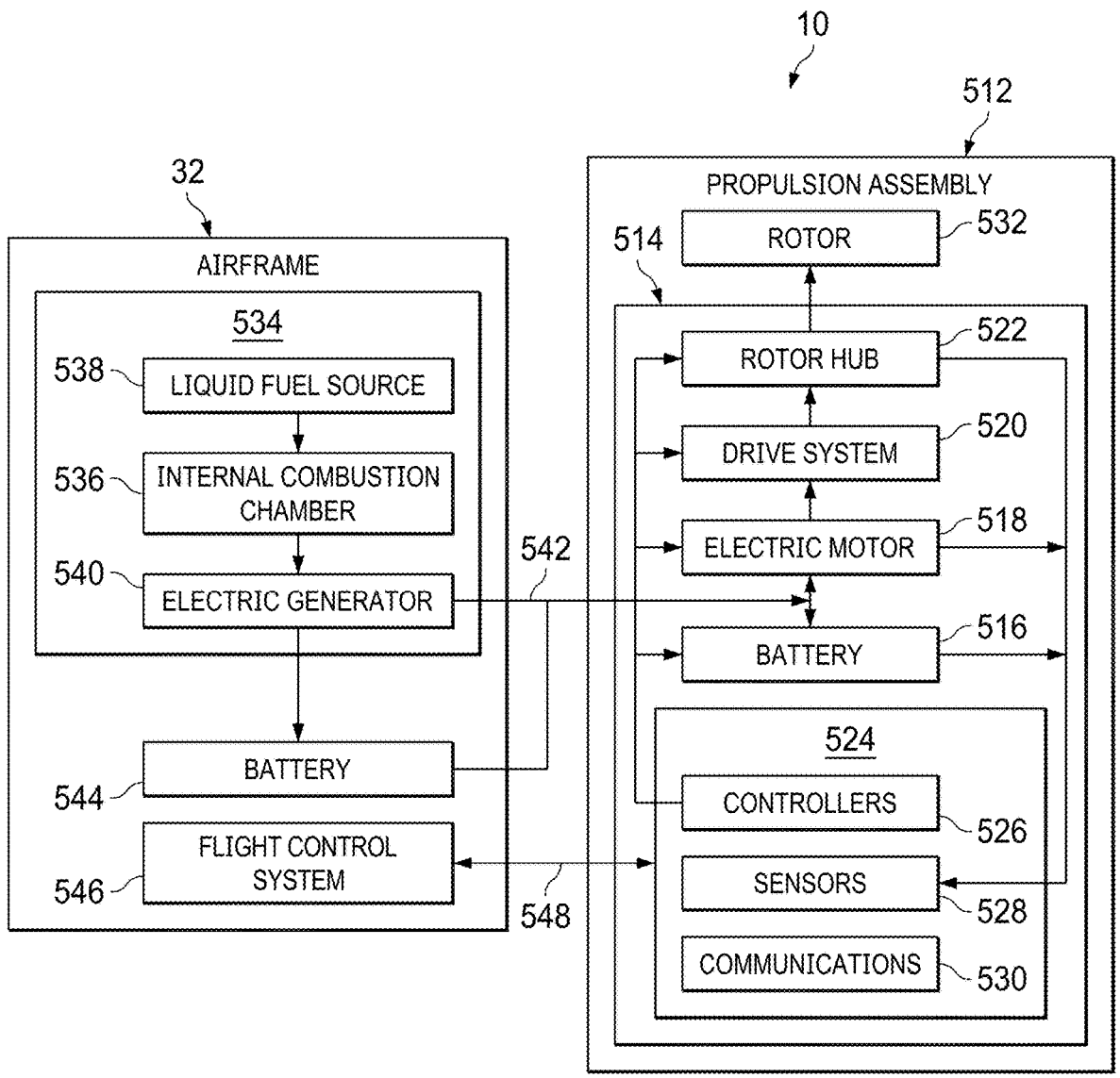
FIG. 5 is a block diagram of an exemplary propulsion and control system for an exemplary VTOL aircraft with tilting rotors and tilting ducted fans aircraft in a forward flight mode according to one or more aspects of the disclosure.

As illustrated in FIG. 5, each propulsion assembly 512 may include a nacelle 514 that houses one or more batteries 516, an electric motor 518, a drive system 520, a rotor hub 522 and an electronics node 524 including, for example, controllers 526, sensors 528 and communications elements 530 as well as other components suitable for use in the operation of a propulsion assembly. Each propulsion assembly 512 also includes a rotor 532 having a plurality of rotor blades that are securably attached to rotor hub 522. The rotor blades may have a fixed pitch or may be operable for pitch changes including, for example, collective and/or cyclic pitch changes. In addition, propulsion assemblies 512 may be operable for independent thrust vectoring.

In the illustrative embodiment, aircraft 10 has an electrical energy source depicted as a liquid fuel based electrical energy generation system 534 that is housed within airframe 32 such as within the fuselage, wings and/or booms. Electrical energy generation system 534 preferably includes one or more internal combustion engines 536. Electrical energy generation system 534 also includes one or more fuel tanks depicted as liquid fuel sources 538. In operation, internal combustion engine 536 is used to drive an electric generator 540 to produce electrical energy. This electrical energy is fed to propulsion assemblies 512 via communication lines 542 within airframe 32 to directly power electric motors 518 and/or for storage within batteries 516. This type of hybrid power system is beneficial as the energy density of liquid fuel exceeds that of batteries enabling greater endurance for aircraft 10.

Alternatively or additionally, airframe 32 may house one or more batteries 544 that may serve as the electrical energy source for propulsion assemblies 512. Batteries 544 may be charged by electrical energy generation system 534 and/or may be charged at a ground station. Batteries 544 may also be interchangeably removed and installed to enable efficient refueling which may be particularly beneficial in embodiments of aircraft 10 wherein the sole electrical energy source are batteries 544. In embodiments having both batteries 544 and electrical energy generation system 534, batteries 544 may provide a backup electrical power source to enable aircraft 10 to safely land in the event of a failure in electrical energy generation system 534. As another alternative, propulsion assemblies 512 may include hydraulic motors operated within a common hydraulic fluid system wherein one or more high pressure hydraulic sources or generators are housed within airframe 32 to provide power to each of the hydraulic motors.

In the illustrative embodiment, aircraft 10 has a flight control system 546 that is housed within airframe 32. Flight control system 546, such as a digital flight control system, can be a redundant flight control system. Flight control system 546 includes non-transitory computer readable storage media including a set of computer instructions executable by one or more processors for controlling the operation of the distributed propulsion system. Flight control system 546 may be implemented on one or more general-purpose computers, special purpose computers or other machines with memory and processing capability. For example, flight control system 546 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 546 may be a microprocessor-based system operable to execute program code in the form of machine-executable instructions. In addition, flight control system 546 may be selectively connectable to other computer systems via a proprietary encrypted network, a public encrypted network, the Internet or other suitable communication network that may include both wired and wireless connections.

Flight control system 546 communicates via a wired and/or wireless communications network 548 with electronics node 524 of each propulsion assembly 512. Flight control system 546 receives sensor data from and sends flight command information to electronics nodes 524 such that each propulsion assembly 512 may be individually and independently controlled and operated. In both manned and unmanned missions, flight control system 546 may autonomously control some or all aspects of flight operation for aircraft 10. Flight control system 546 may also be operable to communicate with one or more remote systems, via a wireless communications protocol. The remote systems may be operable to receive flight data from and provide commands to flight control system 546 to enable remote flight control over some or all aspects of flight operation for aircraft 10, in both manned and unmanned missions. In manned missions, a pilot within aircraft 10 may receive flight data from and provide commands to flight control system 546 to enable onboard pilot control over some or all aspects of flight operation for aircraft 10. In particular, transitions of aircraft 10 between the vertical lift orientation and the forward thrust orientation may be accomplished responsive to onboard pilot flight control, remote flight control, autonomous flight control and combinations thereof.

As best seen in FIGS. 1 and 2, aircraft 10 has a vertical takeoff and landing flight mode wherein the distributed propulsion system is in its vertical lift orientation with tiltable rotors 34 and tiltable ducted fans 36 tilted into the generally horizontal orientation. The physical distribution of tiltable rotors 34, tiltable ducted fans 36, and aft rotors 38 provides a generally circular lift distribution that promotes hover stability and redundancy in the event of loss of one of the propulsion systems. In FIG. 1, the illustrated six rotor propulsion systems are generally equally distributed in a circular pattern. The arrangement and configuration of the distributed propulsion systems minimizes the propwash downlord on airframe 32 and thereby reduces the energy requirements to operate aircraft 10.

Tiltable rotors 34 are positioned in the horizontal orientation above boom forward ends 22a, 24a. In the illustrated configuration, the propwash generated by tiltable rotors 34 create a minimum download on airframe 32 impeded only by forward ends 22a, 24a of booms 22, 24. Ducted fans are not used at the forward position on booms 22, 24 as they can create a lifting surface that can destabilize the aircraft in forward flight.

Ducted fans 36 are positioned on wings 18, 20 and reduce the propwash download relative to a tiltable open rotor used on a wing. Flight control system 546 may independently control and operate each tiltable rotor 34 and tiltable duct 36 to generate lift as well as provide pitch, yaw and roll control.

In an exemplary embodiment, aft rotors 38 are canted relative to the vertical yaw axis Z and the rotational speed of the aft rotors 38 can be varied for yaw control. Aft rotors 38 may be canted, for example, about 5, 10, 15, 20, or 25 degrees. In the exemplary embodiment illustrated in FIG. 3, rotors 38 are canted at about 25 degrees. As shown in FIGS. 1, 2, and 4, left rotor 38 on boom 22 and right rotor 38 on boom 24 are canted in opposite directions from one another.

FIG. 3 schematically illustrates an exemplary sectional view of an aft boom portion 24" proximate to aft rotors 38 along the line 3-3 of FIG. 2. Aft boom portion 24" is representative of aft boom portion 22". In the exemplary embodiment, aft boom portions 22", 24" are formed with a low coefficient of drag ("Cd") profile to minimize the propwash download of aft rotors 38 when in the VTOL mode. The low CD profile may be an airfoil shape such as an oval or teardrop with a chord line 42 extending generally from boom top side 22c, 24c. In this exemplary embodiment, the aft boom portions 22", 24" are also canted relative to the vertical axis Z with the thrust vector 44 of aft rotors 38 extending parallel to chord line 42 of the aft boom portion, accordingly both the aft boom portions and the aft rotors are canted relative to the vertical axis Z.

As best seen in FIG. 4, aircraft 10 has a forward flight mode wherein the distributed propulsion system is in its forward thrust orientation. Tiltable rotors 34 are positioned forward of boom forward ends 22a, 24a. Blades 34b and 36b have a generally vertical orientation taking into account the attitude of aircraft 10. In the illustrated configuration, the propwash generated by tiltable rotors 34 and tiltable fans 36 travels generally in the chordwise direction of wings 18, 20. Aft rotors 38 are not rotating and may be locked in an orientation with blades 38b parallel to booms 22, 24.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A tiltrotor aircraft having a vertical takeoff and landing (VTOL) flight mode and a forward flight mode, the tiltrotor aircraft comprising:
    a fuselage;
    a first wing extending laterally in a first direction from the fuselage and having a first wing tip distal from the fuselage;
    a first tiltable fan coupled to the first wing;
    a second wing extending laterally in a second direction from the fuselage and having a second wing tip distal from the fuselage;
    a second tiltable fan coupled to the second wing;
    a first boom coupled to the first wing, the first boom having a first forward boom end located forward of the first wing and a first boom aft end located aft of the first wing;
    a first tiltable rotor coupled to the first forward boom end;
    a first aft rotor coupled to a top side of an aft portion of the first boom between the first wing and the first boom aft end;
    a second boom coupled to the second wing, the second boom having a second forward boom end located forward of the second wing and a second boom aft end located aft of the second wing;
    a second tiltable rotor coupled to the second forward boom end; and
    a second aft rotor coupled to a top side of an aft portion of the second boom between the second wing and the second boom aft end.

2. The tiltrotor aircraft of claim 1, wherein the first boom is coupled to the first wing inboard of the first wing tip and the second boom is coupled to the second wing inboard of the second wing tip.

3. The tiltrotor aircraft of claim 1, wherein the first tiltable fan is positioned at the first wing tip and the second tiltable fan is positioned at the second wing tip.

4. The tiltrotor aircraft of claim 1, wherein:
    the first boom is coupled to the first wing inboard of the first wing tip and the second boom is coupled to the second wing inboard of the second wing tip; and
    the first tiltable fan is positioned at the first wing tip and the second tiltable fan is positioned at the second wing tip.

5. The tiltrotor aircraft of claim 1, wherein the first and second aft rotors are canted relative to a vertical axis.

6. The tiltrotor aircraft of claim 1, wherein a thrust vector of the first and second aft rotors is generally parallel to a chord line of the respective aft portions of the first and second booms.

7. The tiltrotor aircraft of claim 6, wherein the chord line of the respective aft portions of the first and second booms are canted relative to a vertical axis.

8. The tiltrotor aircraft of claim 7, wherein the chord line of the aft portion of the first boom and the chord line of the aft portion of the second boom are canted in opposite directions.

9. The tiltrotor aircraft of claim 1, wherein:
    the first boom is coupled to the first wing inboard of the first wing tip and the second boom is coupled to the second wing inboard of the second wing tip;

the first tiltable fan is positioned at the first wing tip and the second tiltable fan is positioned at the second wing tip; and the first and second aft rotors are canted relative to a vertical axis.

10. The tiltrotor aircraft of claim 6, wherein the chord line of the aft portion of the first boom and the chord line of the aft portion of the second boom are canted in opposite directions.

11. A method of operating the tiltrotor aircraft of claim 1, the method comprising:
   operating the tiltrotor aircraft in a forward flight mode;
   operating the tiltrotor aircraft in a VTOL flight mode; and
   wherein the first and second tiltable rotors, the first and second tiltable fans, and the first and second aft rotors are rotating and the first and the second tiltable rotors and the first and second tiltable fans are positioned in a generally horizontal plane.

* * * * *